US009194699B2

(12) United States Patent
Seifert

(10) Patent No.: US 9,194,699 B2
(45) Date of Patent: Nov. 24, 2015

(54) METHOD FOR CONTROLLING A MEASURING SYSTEM AND MEASURING SYSTEM FOR IMPLEMENTING THE METHOD

(75) Inventor: Wolfgang Seifert, Wielenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 437 days.

(21) Appl. No.: 13/636,955

(22) PCT Filed: Feb. 22, 2011

(86) PCT No.: PCT/EP2011/052595
§ 371 (c)(1),
(2), (4) Date: Nov. 29, 2012

(87) PCT Pub. No.: WO2011/120739
PCT Pub. Date: Oct. 6, 2011

(65) Prior Publication Data
US 2013/0070086 A1    Mar. 21, 2013

(30) Foreign Application Priority Data
Mar. 29, 2010   (DE) .......................... 10 2010 003 389

(51) Int. Cl.
*H04N 7/18*      (2006.01)
*G01B 11/275*    (2006.01)

(52) U.S. Cl.
CPC .......... *G01B 11/275* (2013.01); *G01B 2210/12* (2013.01); *G01B 2210/143* (2013.01)

(58) Field of Classification Search
None
See application file for complete search history.

(56) References Cited

U.S. PATENT DOCUMENTS

| 6,442,503 B1 | 8/2002 | Bengala |
| 2006/0114531 A1* | 6/2006 | Webb et al. .................. 359/15 |
| 2009/0033744 A1* | 2/2009 | Frantz ......................... 348/148 |
| 2009/0216484 A1* | 8/2009 | Schommer et al. ........... 702/150 |

FOREIGN PATENT DOCUMENTS

| DE | 27 27 420 | 1/1979 |
| DE | 10 2006 041821 | 3/2008 |
| JP | 59 005906 | 1/1984 |

OTHER PUBLICATIONS

International Search Report for PCT/EP2011/052595, dated Apr. 29, 2011.

* cited by examiner

*Primary Examiner* — William C Vaughn, Jr.
*Assistant Examiner* — Eileen Adams
(74) *Attorney, Agent, or Firm* — Kenyon & Kenyon LLP

(57) ABSTRACT

In a method for controlling a measuring system in a chassis measuring station, the motor vehicle is detected automatically in the measuring station by at least one detection unit and its position is ascertained with respect to at least one measuring device which is controlled on the basis of a signal of the detection unit in that an operating state of the measuring device is activated. The measuring system includes at least two mutually opposite measuring devices, which respectively have one image acquisition unit and one transverse referencing unit, and at least one detection unit, which is a light barrier having at least one transmitter and receiver.

16 Claims, 1 Drawing Sheet

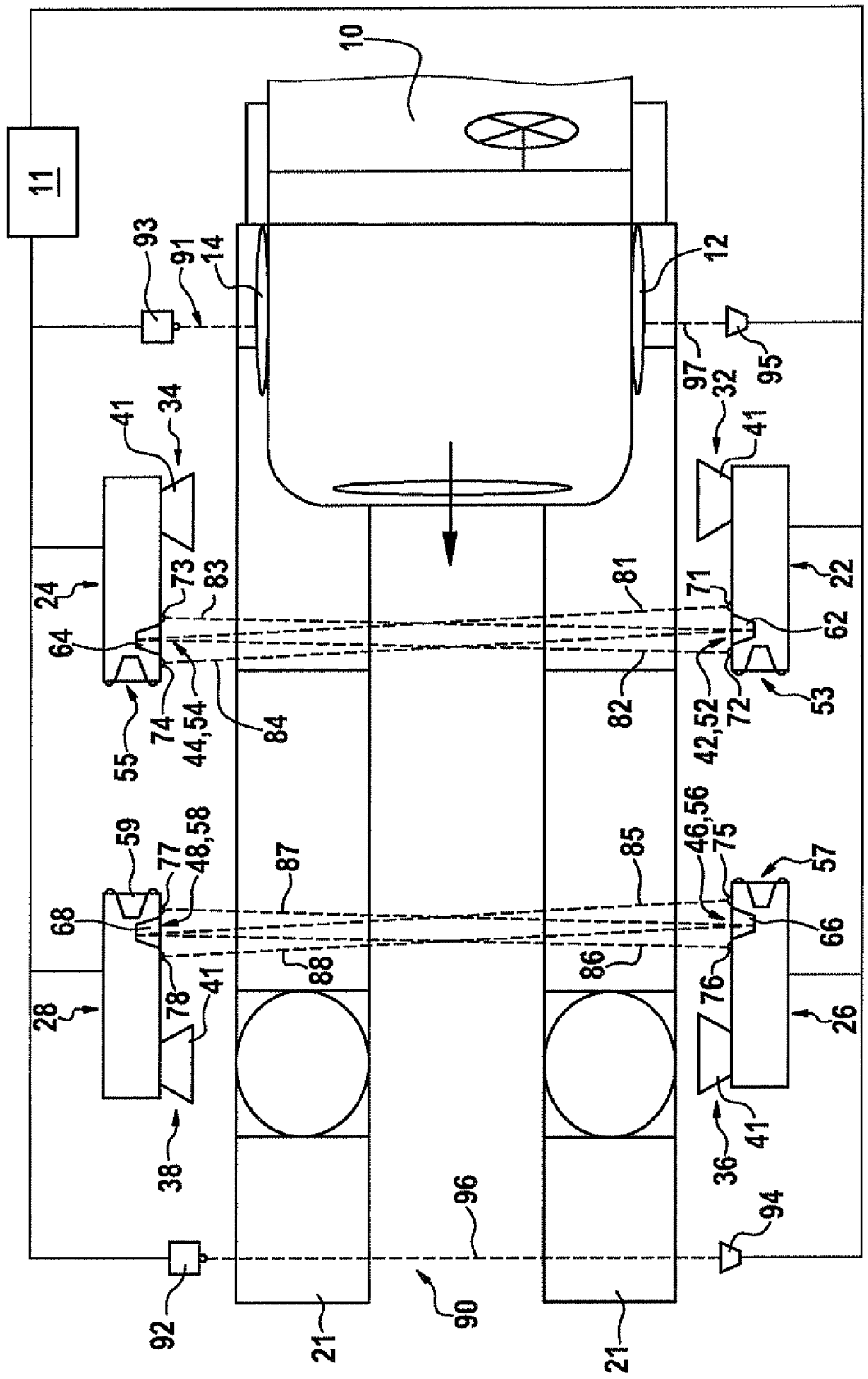

METHOD FOR CONTROLLING A MEASURING SYSTEM AND MEASURING SYSTEM FOR IMPLEMENTING THE METHOD

BACKGROUND OF THE INVENTION

1. Field of the Invention

The present invention relates to a method for controlling a measuring system on a measuring station of a chassis measuring facility or a motor vehicle inspection line and to a measuring system for implementing the method.

2. Description of the Related Art

A method for the relative positioning of an object to be measured and a motor vehicle with respect to a measuring device is already known from published German patent application document DE 10 2006 041 821 A1. In this method, the object to be measured is first detected by the measuring device and the position of the object to be measured with respect to the measuring device is ascertained. Then a feedback signal is generated which indicates whether the object to be measured is located in a position that is suitable for taking the measurement or not. Additional feedback signals make it possible to bring the object to be measured into a position that is suitable for axle measurement. In this method, the measuring cameras are used simultaneously for the wheel detection and for the wheel measurement of the motor vehicles. The measuring system is already switched on long before the actual axle measurement and must take and evaluate pictures at regular intervals until a wheel is detected. This creates a high demand for the illumination of the object to be measured and for the computing power of the measuring device and an evaluation unit, which means an increased energy consumption and makes it difficult to operate the sensor by battery. Since the wheel detection and wheel measurement algorithms normally differ, the pictures taken for wheel detection must be stored temporarily in order to be able to be used for wheel measurement as well, which in the known methods also results in an increased memory requirement in the evaluation device.

BRIEF SUMMARY OF THE INVENTION

By contrast, the method according to the present invention and the measuring system according to the present invention have the advantage that the motor vehicle and the relative position of the motor vehicle with respect to at least one measuring device are detected by a detection unit and an operating state of the measuring device is activated only by a signal from this detection unit. As a result, the measuring device is brought into the required operating state only when necessary. It is not necessary for the measuring system constantly to take and evaluate pictures until a wheel is detected. Less energy is consumed as a result, and the measuring system could also be utilized for battery operation. An operating state of the measuring device includes for example the following states: the calibration of the measuring device by the transverse and longitudinal referencing units, the standby mode of the image-acquisition units, the adjustment of the image-acquisition parameters of the image-acquisition units to the ambient conditions, the startup of the image-acquisition units and the termination of the image acquisition by the image-acquisition units.

In a first advantageous specific embodiment of the method, the operating state to be activated is the start of a referencing unit of the measuring device for calibrating the measuring system. Following the conclusion of the calibration of the measuring system, the image-acquisition unit is activated by illuminating the object to be measured using a light pattern and evaluating the light pattern by an image acquisition.

In one advantageous development of the method, the measuring system is calibrated by the signal of at least one first (in the direction of entry of the motor vehicle) detection unit and the image acquisition is started in at least two opposite measuring devices. This allows for a later start of the image acquisition, which means a reduction of the energy requirement and a lower processor load. The advantages of the method may also be applied to smaller measuring systems having two measuring devices and one detection unit.

Another specific embodiment of the method provides for the signal of a first detection unit to calibrate the measuring system and switch the image acquisition units into a standby mode. For this purpose, the actual image acquisition is started in a time-staggered manner or only by another signal of a second detection unit. The repeated detection of the motor vehicle in the measuring system makes it possible to determine the position of the motor vehicle more precisely and to start the image acquisition for axle measurement later, which means even greater energy savings and an even lower processor load.

One advantageous development of the method comprises the automatic termination of the image acquisition on the measuring devices. If the motor vehicle leaves the measuring station following the axle measurement, then the measurement may be terminated by another signal of a first or second detection unit. This has the advantage that the cameras take only pictures that are required for the axle measurement so as to avoid taking unnecessarily many pictures, to avoid loading the memory capacities of the computer unnecessarily, and to reduce the energy requirement further.

Another advantage may be achieved by determining the direction and speed of the motor vehicle on the basis of the signals from at least two detection units situated one behind the other in the direction of entry of the motor vehicle. This also makes it possible to provide an operator, who is not present at the motor vehicle inspection line, with more precise information about the sequence and the correct implementation of the measurement.

One advantageous development, which results from the calculation of the direction and the speed of the motor vehicle, is the simpler determination of a time window for activating the image acquisition unit. Determining a time window makes it possible to terminate the measurement even without an additional signal from the detection units, and unnecessary image acquisitions may be avoided. Aside from the time window for the image acquisitions, it is possible to determine from the speed also an optimized frequency for the image acquisition such that the number of image acquisitions and the number of illuminations of the wheels are optimized by the signals of the detection units.

Another advantage results from a plausibility check with the aid of the data records for the direction and speed of a motor vehicle or of another object. In this connection, a check is performed to determine whether a motor vehicle, another object or a person is located in the measuring station. Thus it is possible to avoid starting an undesired calibration of the measuring system and starting an undesired measurement using the image acquisition units.

The method according to the present invention may be implemented particularly advantageously in existing measuring systems of axle measuring devices in that the transverse referencing units are at the same time used as detection units, a reference camera of the transverse referencing unit of the one measuring device forming the receiver and at least one LED of the opposite measuring device in the form of a reference target forming the transmitter of a light barrier. This makes it possible to use the already existing transverse referencing units in a measuring system for axle alignment as light barriers or detection units, which has the advantage that no additional components have to be supplemented as a detection unit.

For this purpose, a particularly advantageous specific embodiment provides for the use of a first light barrier (viewed in the direction of entry of the motor vehicle) of two opposite measuring devices that contain the image acquisition unit for the rear wheels of the motor vehicle, and a second light barrier (viewed in the direction of entry of the motor vehicle) of two opposite measuring devices, which contain the image acquisition unit for the front wheels.

One advantageous development of the measuring system is obtained by a detection unit, which is situated behind one or two opposite measuring devices (viewed in the direction of entry of the motor vehicle), and by ending the calibration and/or image acquisition on the basis of a signal of the detection unit. When a motor vehicle breaks a light barrier, which represents the detection unit, then the measurement is ended and it is possible to ensure that no unnecessary computer capacities are required, no unnecessary energy is consumed and no unnecessary load is placed on the components of the measuring devices.

Furthermore, the triggering of an operating state by a detection unit, which may be implemented e.g. by a light barrier or an ultrasonic sensor, may occur at the entry to the measuring station. Here it is expedient to integrate such a detection unit for example in one or both of the front measuring devices. In the initial setup of the measuring system, the position of the detection unit relative to at least one measuring device is then recorded in the evaluation unit of the measuring system.

BRIEF DESCRIPTION OF THE DRAWING

The FIGURE shows a schematic view of a measuring station of a chassis measuring facility for a measuring system for measuring the chassis of a motor vehicle.

DETAILED DESCRIPTION OF THE INVENTION

The represented measuring station shows a motor vehicle 10, which is situated in the measuring station so that its chassis may be measured. Motor vehicle 10 has a front left wheel 12, a front right wheel 14, and a rear left wheel and a rear right wheel, which are not shown in the FIGURE.

The measuring station has two elongated tire contact areas 21 having rotating and sliding plates as contact areas for front wheels 12, 14 and for the rear wheels (not shown). These elongated tire contact areas 21 are developed as travel rails in the case of lifting platforms, and as drive-up areas in the case of repair shop pits.

Four measuring devices 22, 24, 26, 28 are positioned on the measuring station, measuring device 22 being used for the rear left wheel, measuring device 24 being used for the rear right wheel, measuring device 26 being used for the front left wheel 12 and measuring device 28 being used for the front right wheel 14. Measuring devices 22, 24, 26, 28 respectively have one image acquisition unit 32, 34, 36, 38, one transverse referencing unit 52, 54, 56, 58 and one longitudinal referencing unit 53, 55, 57, 59. Image acquisition units 32, 34, 36, 38 respectively have at least one measuring camera 41 and respectively at least one measuring signal transducer (not shown).

Transverse referencing units 52, 54, 56, 58 and longitudinal referencing units 53, 55, 57, 59 are used for the optical measurement of the relative angularities and distances of measuring devices 22, 24, 26, 28 with respect to one another. When using these referencing units, a rough alignment of measuring devices 22, 24, 26, 28 is sufficient for an exact determination of the relative positions and the distances of measuring devices 22, 24, 26, 28 with respect to one another. These may be measured and also readjusted continuously. The function of such a measuring station is known for example from DE 10 2004 013 441 A1.

Each transverse referencing unit 52, 54, 56, 58 has at least one referencing camera 62, 64, 66, 68 and at least one referencing target. In the FIGURE, the referencing targets on each transverse referencing unit 52, 54, 56, 58 are developed as LEDs 71, 72, 73, 74, 75, 76, 77, 78, each transverse referencing unit 52, 54, 56, 58 in the present exemplary embodiment having two LEDs 71, 72, 73, 74, 75, 76, 77, 78 for the opposite referencing camera 62, 64, 66, 68. In the FIGURE, the left rear transverse referencing unit 52 is formed by referencing camera 62 and LEDs 71, 72. LEDs 71, 72 emit two light beams 81, 82, which are picked up by opposite referencing camera 64. The right rear transverse referencing unit 54 is formed by referencing camera 64 and LEDs 73, 74. LEDs 73, 74 emit two light beams 83, 84, which are picked up by opposite referencing camera 62. The left front transverse referencing unit 56 is formed by referencing camera 66 and LEDs 75, 76. LEDs 75, 76 emit two light beams 85, 86, which are picked up by opposite referencing camera 68. The right front transverse referencing unit 58 is formed by referencing camera 68 and LEDs 77, 78. LEDs 77, 78 emit two light beams 87, 88, which are picked up by opposite referencing camera 66.

The measuring station has detection units 42, 44, 46, 48, 90, 91 of such a kind whether a motor vehicle 10 has assumed a specific position within the measuring station and/or whether another object is located in the measuring station and/or whether an operator has stepped into the measuring station.

According to a first exemplary embodiment, detection units 42, 44, 46, 48 are formed by transverse referencing units 52, 54, 56, 58. For this purpose, the optical operating principle between opposite LEDs 71, 72, 73, 74, 75, 76, 77, 78 and referencing cameras 62, 64, 66, 68 of the transverse referencing units 52, 54, 56, 58 is used as a light barrier.

Transverse referencing units 52, 54 of measuring devices 22, 24 for the rear wheels are situated behind (viewed in the entry direction) measuring cameras 41 and the corresponding measuring signal transducers, while transverse referencing units 56, 58 of measuring devices 26, 28 for the front wheels 12, 14 are situated in front (viewed in the entry direction) of measuring cameras 41. Other positions of transverse referencing units 52, 54, 56, 58 with respect to measuring cameras 41 may also be chosen, however. For this purpose, transverse referencing units 52, 54 of measuring devices 22, 24 form the first (viewed in the direction of entry of motor vehicle 10) detection unit 42, 44, and transverse referencing units 56, 58 of measuring devices 26, 28 form the second (viewed in the direction of entry) detection unit 46, 48.

Measuring devices 22, 24, 26, 28 are connected to an evaluation unit 11, in particular a workshop computer. The workshop computer allows for an exchange of signals between transverse referencing units 52, 54, 56, 58, longitudinal referencing units 53, 55, 57, 59, image acquisition units 32, 34, 36, 38 and the measuring signal transducers (not shown) of such a kind that it is possible to activate an operating state using the signals supplied by detection units 42, 44, 46, 48, 90, 91. The activation of an operating state includes at least one of the following processes:

a) the measuring devices 22, 24, 26, 28 are calibrated by transverse and longitudinal referencing units 51, 52, 53, 54, 55, 56, 57, 58, 59, b) the image acquisition is switched to a standby operating mode by image acquisition unit 32, 34, 36, 38, c), the image acquisition parameters of image acquisition units 32, 34, 36, 38 are adjusted to the ambient conditions, d) the image acquisition by image acquisition units 32, 34, 36, 38 is put into operation or taken out of operation.

In an alternative development, measuring devices 22, 24, 26, 28 are mutually connected, measuring devices 22, 24, 26, 28 respectively containing evaluation units 11 and cooperating in a master-slave configuration. For this purpose, the master measuring device may take over the function of the workshop computer.

In the following, a method will be explained for controlling a measuring system in the measuring station of a chassis measuring facility.

In addition to the exemplary embodiment shown in the FIGURE of a chassis measuring facility having four measuring devices 22, 24, 26, 28, it is also possible to provide only two measuring devices 22, 24 or 26, 28 situated opposite from each other and perpendicular to the entry direction of the motor vehicle. The measuring devices 22, 24, 26, 28 shown in the FIGURE operate in a contactless and targetless manner on the basis of an optical measurement in that the measuring signal transducers (not shown) project an illumination pattern onto the wheel to be measured and the illumination pattern is picked up by measuring cameras 41 and is converted into spatial coordinates for determining the position (toe, camber) of the wheel by evaluation unit 11. The method may also be used in contactless and target-bound measuring systems.

At the beginning of the method, transverse referencing units 52, 54, 56, 58 are switched on. This switch-on action occurs either directly on the measuring device or, in the event that multiple measuring devices 22, 24, 26, 28 are provided, on the respective measuring devices 22, 24, 26, 28 provided for measurement. In the event that multiple measuring devices 22, 24, 26, 28 are provided, the switch-on process may also be controlled from one measuring device such that the user only needs to switch on one measuring device. Alternatively, the switch-on action may also take place on an evaluation unit 11, especially on a workshop computer that is connected to the measuring device or measuring devices 22, 24, 26, 28.

In the subsequent step, the measuring station is monitored by the first (viewed in the direction of entry of motor vehicle 10) opposite transverse referencing units 52 and 54 (first detection unit 42, 44). The respective referencing targets (LEDs) 71, 72, 73, 74 emit a continuous or periodic light signal, which is represented by one or multiple light beams 81, 82, 83, 84. The light signal is picked up by the associated referencing cameras 62, 64. Motor vehicle 10 moves forward on tire contact areas 21 in the direction of entry and darkens the light signal of the first opposite transverse referencing units 52 and 54 after a certain length of travel. The interruption of the light signal causes evaluation unit 11 to transmit a signal to one or multiple measuring devices 22, 24, 26, 28, and measuring devices 22, 24, 26, 28 are first calibrated by the transverse and longitudinal referencing units. Furthermore, following the calibration of measuring devices 22, 24, 26, 28, one or multiple image acquisition units 32, 34, 36, 38 are taken into operation, and front wheels 12, 14 and/or the rear wheels of motor vehicle 10 are measured.

In the method described above, the measuring station may also be monitored by second (viewed in the direction of entry of motor vehicle 10) opposite transverse referencing units 56, 58. The respective referencing targets (LEDs) 75, 76, 77, 78 emit a continuous or periodic light signal, which is formed by one or multiple light beams 85, 86, 87, 87, 88 and is picked up by the associated referencing cameras 66, 68. Motor vehicle 10 moves forward on tire contact areas 21 in the direction of entry and darkens the light signal of transverse referencing units 56 and 58 after a certain length of travel. The interruption of the light signal of transverse referencing units 56 and 58 causes the transmission of a signal to one or multiple measuring devices 22, 24, 26, 28, and measuring devices 22, 24, 26, 28 are calibrated. Furthermore, following the calibration, the signal puts the respective measuring device into operation for measuring using image acquisition units 32, 34, 36, 38, and front wheels 12, 14 and/or the rear wheels of motor vehicle 10 are measured.

In one further development of the method, the measuring station is monitored by the first (viewed in the direction of entry of motor vehicle 10) opposite transverse referencing units 52 and 54 and by the second (viewed in the direction of entry of motor vehicle 10) opposite transverse referencing units 56 and 58. Referencing targets (LEDs) 71, 72, 73, 74 of the first (viewed in the direction of entry) transverse referencing units 52 and 54 emit a continuous or periodic first light signal, which is formed by one or multiple light beams 81, 82, 83, 84 and is picked up by the associated referencing cameras 62, 64. Referencing targets (LEDs) 75, 76, 77, 78 of the second (viewed in the direction of entry of motor vehicle 10) transverse referencing units 56 and 58 emit a continuous or periodic second light signal, which is formed by one or multiple light beams 85, 86, 87, 88 and is picked up by the associated referencing cameras 66, 68. Motor vehicle 10 moves forward on tire contact areas 21 in the direction of entry and darkens the first light signal of transverse referencing units 52 and 54 after a certain length of travel. The interruption of the light beams causes a first signal to be transmitted to one or multiple measuring devices 22, 24, 26, 28, and measuring devices 22, 24, 26, 28 are switched into a standby state, and measuring devices 22, 24, 26, 28 are furthermore calibrated. If motor vehicle 10 moves further forward in the direction of entry on tire contact areas 21 and darkens the second light signal of transverse referencing units 56 and 58, a second signal is transmitted to one or multiple measuring devices 22, 24, 26, 28. The second signal triggers the start of the measurement using image acquisition units 32, 34, 36, 38 such that front wheels 12, 14 and the rear wheels (not shown) of motor vehicle 10 may be measured.

Another method for starting the measurements using image acquisition units 32, 34, 36, 38 and for starting the calibration by the longitudinal and transverse referencing units 52, 53, 54, 55, 56, 57, 58, 59 is provided by the installation of detection unit 91 in front of two opposite measuring devices 22, 24, 26, 28. This detection unit 91 has at least one transmitter 93 and one receiver 95 and is connected via evaluation unit 11 to image acquisition units 32, 34, 36, 38 and longitudinal and transverse referencing units 52, 53, 54, 55, 56, 57, 58, 59. Detection unit 91 may be developed, for example, as a light barrier or an ultrasonic sensor. In the FIGURE, detection unit 91 is installed in front (viewed in the direction of entry of motor vehicle 10) of measuring devices 22, 24 provided for measuring the rear wheels (not shown). If motor vehicle 10 is moving forward onto tire contact areas 21 of the measuring station in the direction of entry, then at least one signal beam 97 of detection unit 91 is changed or interrupted and a start signal is given to measuring devices 22, 24,

26, 28, which is used to start the measurement using image acquisition units 32, 34, 36, 38 and to start the calibration by longitudinal and transverse referencing units 52, 53, 54, 55, 56, 57, 58, 59.

The measurement of image acquisition units 32, 34, 36, 38 may be terminated by another method step. In this connection, the measuring station is also monitored during the axle measurement using image acquisition units 32, 34, 36, 38 by first transverse referencing units 52, 54 and/or second transverse referencing units 56, 58. If motor vehicle 10 moves on tire contact areas 21 forward down from the measuring station, one or more of light beams 81, 82, 83, 84, 85, 86, 87, 88 is/are again darkened by the rear wheels (not shown). This gives a final signal to measuring devices 22, 24, 26, 28, which is used to terminate the measurement using image acquisition units 32, 34, 36, 38 and to terminate the calibration by longitudinal and transverse referencing units 52, 53, 54, 55, 56, 57, 58, 59.

Another method for terminating the measurements using image acquisition units 32, 34, 36, 38 and for terminating the calibration by the longitudinal and transverse referencing units 52, 53, 54, 55, 56, 57, 58, 59 is provided by the installation of detection unit 90 behind two opposite measuring devices 22, 24, 26, 28. This detection unit 90 has at least one transmitter 92 and one receiver 94 and is connected via evaluation unit 11 to image acquisition units 32, 34, 36, 38 and longitudinal and transverse referencing units 52, 53, 54, 55, 56, 57, 58, 59. Detection unit 90 may be developed, for example, as a light barrier or an ultrasonic sensor. In the FIGURE, detection unit 90 is installed behind (viewed in the direction of entry of motor vehicle 10) measuring devices 26, 28 provided for measuring front wheels 12, 14. If motor vehicle 10 is moving forward on tire contact areas 21 down from the measuring station in the direction of entry, then at least one signal beam 96 of detection unit 90 is changed or interrupted and a terminating signal is given to measuring devices 22, 24, 26, 28, which is used to end the measurement using image acquisition units 32, 34, 36, 38 and to end the calibration by longitudinal and transverse referencing units 52, 53, 54, 55, 56, 57, 58, 59.

An alternative method for terminating the measurements provides for using the images acquired by the image acquisition units 32, 34, 36, 38 in order to detect that the vehicle to be measured has moved out of the measuring area. This may be done already during the evaluation in connection with the wheel measurement algorithms. Generally known image processing technologies are also suited to detect that the object to be measured has left the image area of all measuring cameras 41.

Another variant of the method described above is used for determining the direction of travel and the speed of motor vehicle 10 in the measuring station. If a motor vehicle 10 moves on tire contact areas 21 of the measuring station through at least two successive (in the direction of entry of the motor vehicle) light beams of opposite transverse referencing units 52, 54 or 56, 58, then the direction of travel of motor vehicle 10 may be calculated from the sequence of the interruption of light beams 81, 82, 83, 84, 85, 86, 87, 88. If in the same process one determines the time between the darkening of at least two successive (viewed in the direction of entry of motor vehicle 10) light beams 81, 82, 83, 84, 85, 86, 87, 88, then it is possible to calculate the speed of motor vehicle 10. In another step, the speed of motor vehicle 10 may be used to determine a time window for the measurement using image acquisition units 32, 34, 36, 38. Furthermore, it is possible to calculate the optimum image acquisition frequency and/or number of image acquisitions from the speed of motor vehicle 10 and the signals of transverse referencing units 52, 54, 56, 58.

A further development of the method is obtained from the data records for the speed and direction of motor vehicle 10 in the measuring station. These data may be used for plausibility checks so as to check whether a motor vehicle 10, another object or a person is located in the measuring station. Thus it is possible to avoid starting an undesired calibration of the measuring system by longitudinal and transverse referencing units 52, 54, 56, 58, 53, 55, 57, 59 and starting an undesired measurement using image acquisition units 32, 34, 36, 38.

What is claimed is:

1. A method for controlling a measuring system in a motor vehicle inspection station, the measuring system having at least one measuring device and a least one detection unit for automatically detecting a motor vehicle in the inspection station, the method comprising:
   ascertaining a relative position of the motor vehicle with respect to the measuring device on the basis of at least one signal of the detection unit; and
   using at least one signal of the detection unit to activate at least one operating state of the measuring device;
   wherein the activation of the at least one operating state of the measuring device includes activation of at least one of (i) a referencing unit of the measuring device for calibrating the measuring system and (ii) an image acquisition unit of the measuring device for acquiring an image of one of an object to be measured or the motor vehicle, and
   wherein there are multiple measuring devices and multiple detection units in the measuring system;
   based on at least one signal of a first detection unit located nearest to the entry point of the motor vehicle into the inspection station, the measuring system is calibrated and the image acquisition unit in at least one measuring device is switched to a standby mode; and
   based on at least one signal of a second detection unit which is further away than the first detection unit from the entry point of the motor vehicle into the inspection station, image acquisition of the image acquisition units in at least two opposite measuring devices is started.

2. The method as recited in claim 1, wherein:
   multiple measuring devices and multiple detection units are provided in the measuring system;
   on the basis of at least one signal of a first detection unit located nearest to the entry point of the motor vehicle into the inspection station, the measuring system is calibrated and image acquisition of the image acquisition units in at least two opposite measuring devices is started.

3. The method as recited in claim 1, wherein the switching of the image acquisition unit into the standby mode includes a process of adjusting image acquisition parameters to ambient conditions.

4. The method as recited in claim 1, wherein on the basis of at least one repeated signal of one of the first detection unit or the second detection unit, image acquisition of the image acquisition unit in at least one measuring device is terminated.

5. The method as recited in claim 1, wherein at least two successive detection units are provided in the measuring system along the direction of entry of the motor vehicle into the inspection station, and signals of the at least two successive detection units are used to ascertain at least one of a direction and speed of the motor vehicle.

6. The method as recited in claim 5, wherein the ascertained speed of the motor vehicle is used to determine a time window for activating an image acquisition unit of the measuring device.

7. The method as recited in claim 5, further comprising:
performing a plausibility check with the aid of at least one of the ascertained speed and the ascertained direction of the motor vehicle, wherein the plausibility check determines whether one of another object or a person is present in the inspection station.

8. The method as recited in claim 1, wherein the activation of the at least one operating state of the measuring device includes the activation of an image acquisition unit of the measuring device for acquiring an image of one of an object to be measured or the motor vehicle.

9. The method as recited in claim 1, wherein the activation of at least one operating state of the measuring device includes activation of the referencing unit of the measuring device for calibrating the measuring.

10. A measuring system for a motor vehicle inspection station, comprising:
at least two opposite measuring devices each having one image acquisition unit and one transverse referencing unit, wherein each measuring device is connected to an evaluation unit; and at least one detection unit for automatically detecting a motor vehicle in the inspection station;
wherein at least a relative position of the motor vehicle with respect to the measuring devices is ascertained on the basis of a signal of the detection unit, and wherein the detection unit supplies at least one signal to the evaluation unit to activate at least one operating state of at least one measuring device, and
wherein the activation of at least one operating state of the measuring device includes activation of at least one of (i) the referencing unit of the measuring device for calibrating the measuring system and (ii) the image acquisition unit of the measuring device for acquiring an image of one of an object to be measured or the motor vehicle, and
wherein there are multiple measuring devices and multiple detection in the measuring system;
based on at least one signal of a first detection unit located nearest to the entry point of the motor vehicle into the inspection station, the measuring system is calibrated and the image acquisition unit in at least one measuring device is switched to a standby mode; and
based on at least one signal of a second detection unit which is further away than the first detection unit from the entry point of the motor vehicle into the inspection station, image acquisition of the image acquisition units in at least two opposite measuring devices is started.

11. The measuring system as recited in claim 10, wherein:
a referencing camera of the transverse referencing unit of a first measuring device forms a receiver of the detection unit; and
at least one LED configured as a referencing target of a second measuring device forms a transmitter of the detection unit.

12. The measuring system as recited in claim 10, wherein:
multiple detection units are provided;
a first detection unit located nearest to the entry point of the motor vehicle into the inspection station is formed by two opposite transverse referencing units which are contained in the measuring devices having the image acquisition units for rear wheels of the motor vehicle;
a second detection unit which is further away than the first detection unit from the entry point of the motor vehicle into the inspection station is formed by two opposite transverse referencing units which are contained in the measuring devices having the image acquisition units for front wheels of the motor vehicle.

13. The measuring system as recited in claim 10, wherein the detection unit is located nearer than the at least two opposite measuring devices to the entry point of the motor vehicle into the inspection station, and at least one of (i) calibration of the measuring system by the referencing units of the measuring devices, and (ii) image acquisition by the image acquisition units of the measuring devices is terminated on the basis of a signal of the detection unit.

14. The measuring system as recited in claim 10, wherein the detection unit is located further away than the at least two opposite measuring devices to the entry point of the motor vehicle into the inspection station, and at least one of (i) calibration of the measuring system by the referencing units of the measuring devices, and (ii) image acquisition by the image acquisition units of the measuring devices is terminated on the basis of a signal of the detection unit.

15. The measuring system as recited in claim 10, wherein the activation of at least one operating state of the measuring device includes activation of the image acquisition unit of the measuring device for acquiring an image of one of an object to be measured or the motor vehicle.

16. The measuring system as recited in claim 10, wherein the activation of at least one operating state of the measuring device includes activation of the referencing unit of the measuring device for calibrating the measuring.

* * * * *